US012663957B2

(12) United States Patent
    Zhang

(10) Patent No.: US 12,663,957 B2
(45) Date of Patent: Jun. 23, 2026

(54) VR HEADBAND HAVING AUDIO, DATA TRANSMISSION, AND CHARGING FUNCTIONS, AND CONTROL CIRCUIT

(71) Applicant: Shenzhen KIWI Design Co., Ltd., Shenzhen (CN)

(72) Inventor: Zhinan Zhang, Shenzhen (CN)

(73) Assignee: Shenzhen KIWI Design Co., Ltd., Shenzhen (CN)

( * ) Notice: Subject to any disclaimer, the term of this patent is extended or adjusted under 35 U.S.C. 154(b) by 223 days.

(21) Appl. No.: 18/390,108

(22) Filed: Dec. 20, 2023

(65) Prior Publication Data

US 2024/0201939 A1    Jun. 20, 2024

(30) Foreign Application Priority Data

Dec. 20, 2022    (CN) ......................... 202211644118.9

(51) Int. Cl.
    *G06F 3/16*      (2006.01)
    *G06F 1/16*      (2006.01)
    *G06F 13/42*     (2006.01)
    *H02J 7/00*      (2006.01)
    *H02J 7/70*      (2026.01)
    *H04R 1/10*      (2006.01)
    *H04R 1/1025*    (2026.01)
(52) U.S. Cl.
    CPC .............. *G06F 3/165* (2013.01); *G06F 1/163* (2013.01); *G06F 3/162* (2013.01); *G06F 13/4282* (2013.01); *H02J 7/70* (2026.01); *H02J 7/865* (2026.01); *H04R 1/1008* (2013.01); *H04R 1/1025* (2013.01); *H04R 2499/15* (2013.01)

(58) Field of Classification Search
    CPC .......... G06F 1/163; G06F 1/162; G06F 1/165; H04R 1/1008; H04R 1/1025; H02J 7/00; H02J 7/0068
    USPC .......................................................... 381/74
    See application file for complete search history.

(56) References Cited

U.S. PATENT DOCUMENTS

2018/0219404 A1 *   8/2018   Urbach .................... G06F 1/163

FOREIGN PATENT DOCUMENTS

CN            108182765 A   *   6/2018   ............. G07F 17/12
CN            109861038 B   *   8/2021

* cited by examiner

*Primary Examiner* — George C Monikang

(57) ABSTRACT

Disclosed is a VR headband having audio, data transmission, and charging functions, and a control circuit. The VR headband includes a headband body and a power storage component, a transmission line, and an earphone integrally disposed on the headband body. The control circuit includes a DSP audio circuit, a data transmission circuit, a charging circuit, and a discharging circuit. The DSP audio circuit is configured to perform signal optimization on audio data inputted by VR glasses; the data transmission circuit is configured to convert a differential signal inputted by a USB-C base on the power storage component; the charging circuit is configured to buck a high voltage inputted by the USB-C base; and the discharging circuit is configured to boost a voltage outputted by the rechargeable battery. The present invention has the advantages of convenient charging, data transmission, and audio reception of the VR glasses.

18 Claims, 10 Drawing Sheets

Type-C Input

Type-C Output

VR HEADBAND HAVING AUDIO, DATA TRANSMISSION, AND CHARGING FUNCTIONS, AND CONTROL CIRCUIT

CROSS REFERENCE TO RELATED APPLICATIONS

The present application claims the benefit of Chinese Patent Application No. 202211644118.9 filed on Dec. 20, 2022, the contents of which are incorporated herein by reference in their entirety.

TECHNICAL FIELD

The present invention relates to the technical field of VR, and in particular, to a VR headband having audio, data transmission, and charging functions, and a control circuit.

BACKGROUND

A virtual reality (VR) technology is a computer simulation technology that simulates the environment to experience a virtual world. Display principles of a head-mounted virtual reality display apparatus include that the left and right eyes of an individual respectively obtain two images, of a same object, generated by a display system and having an image difference, so that a stereoscopic impression is generated, which is also known as VR head display.

Accompanied with the development of the VR technology and the increasingly demanding experience needs of users, being smarter, lighter, and more integrally multi-functional have become an important research direction, for which many structural and functional interferences need to be overcome. Therefore, how to achieve better, smarter, lighter, and more integrally multi-functional immersive experience is a significant matter to deal with urgently.

SUMMARY

An objective of the present invention is to provide a VR headband having audio, data transmission, and charging functions, and control circuit, aiming to solve the problem of how to achieve smarter, lighter, and more integrally multi-functional requirements on the VR head display of the prior art.

In a first aspect, an embodiment of the present invention provides a control circuit having audio, data transmission, and charging functions, applied to a VR headband, where the VR headband includes a headband body, and an earphone, a power storage component, and a transmission line integrally disposed on the headband body; and the control circuit includes:

a DSP audio circuit, where an input end of the DSP audio circuit is connected to VR glasses, an output end of the DSP audio circuit is connected to the earphone, and the DSP audio circuit is configured to perform signal optimization on audio data inputted by the VR glasses and then output optimized audio data to the earphone;

a data transmission circuit, where an input end of the data transmission circuit is connected to a USB-C base on the power storage component, an output end of the data transmission circuit is connected to the transmission line, and the data transmission circuit is configured to convert a differential signal inputted by the USB-C base and then output a converted signal to the transmission line;

a charging circuit, where an input end of the charging circuit is connected to the USB-C base, an output end of the charging circuit is connected to a rechargeable battery in the power storage component, and the charging circuit is configured to buck a high voltage inputted by the USB-C base and then output a bucked voltage to the rechargeable battery; and a discharging circuit, where an input end of the discharging circuit is connected to the rechargeable battery, an output end of the discharging circuit is connected to the transmission line, and the discharging circuit is configured to boost a voltage outputted by the rechargeable battery and then output a boosted voltage to the transmission line.

In a second aspect, an embodiment of the present invention provides a VR headband having audio, data transmission, and charging functions, including:

a headband body;

a power storage component, disposed on a rear side of the headband body, where the power storage component includes a circuit board and a rechargeable battery connected to the circuit board;

a USB-C base, disposed on the power storage component and connected to the circuit board;

a transmission line, connected to the circuit board; and an earphone, disposed on the headband body, where the USB-C base is configured to externally connect a power supply, so as to charge the rechargeable battery;

the USB-C base is further configured to externally connect a terminal device, so as to perform signal transmission on the transmission line;

the transmission line is configured to connect VR glasses mounted on a front side of the headband body, so as to supply power and transmit a signal to the VR glasses; and the earphone is configured to connect the VR glasses, so as to receive an audio.

The embodiments of the present invention disclose a VR headband having audio, data transmission, and charging functions and a control circuit. The VR headband includes a headband body, a power storage component, a USB-C base, a transmission line, and an earphone; the power storage component is disposed on a rear side of the headband body, and the power storage component includes a circuit board and a rechargeable battery connected to the circuit board; the USB-C base is disposed on the power storage component and connected to the circuit board; the transmission line is connected to the circuit board; the earphone is disposed on the headband body; the USB-C base is configured to externally connect a power supply, so as to charge the rechargeable battery; the USB-C base is further configured to externally connect a terminal device, so as to perform signal transmission on the transmission line; the transmission line is configured to connect VR glasses mounted on a front side of the headband body, so as to supply power and transmit a signal to the VR glasses; and the earphone is configured to connect the VR glasses, so as to receive an audio. In the embodiments of the present invention, the power storage component, the transmission line, and the earphone are integrated into the VR headband, which has the advantages of facilitating charging, data transmission, and audio reception of the VR glasses.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

REFERENTIAL NUMERALS

1. headband body;
2. power storage component; 21. USB-C base; 22. circuit board; 23. rechargeable battery;
3. transmission line; and
4. earphones.

DETAILED DESCRIPTION

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present invention.

It is to be understood that the terms "include" and "comprise" used in the specification and the appended claims refer to the presence of stated features, integers, steps, operations, elements, and/or components, but do not preclude the presence or addition of one or more other features, integers, steps, operations, elements, components, and/or a combination thereof.

It is also to be understood that the terms used in the description of the present invention herein is for the purpose of describing particular embodiments only and is not intended to be limiting of the present invention. As used in the specification and the appended claims of the present invention, the singular forms "a", "an", and "the" are intended to include the plural forms, unless otherwise specified in the context clearly.

It is to be further understood that the term "and/or" used in the specification of the present invention and the appended claims refers to any combination and all possible combinations of one or more of the associated listed items, and includes these combinations.

Figure 1:
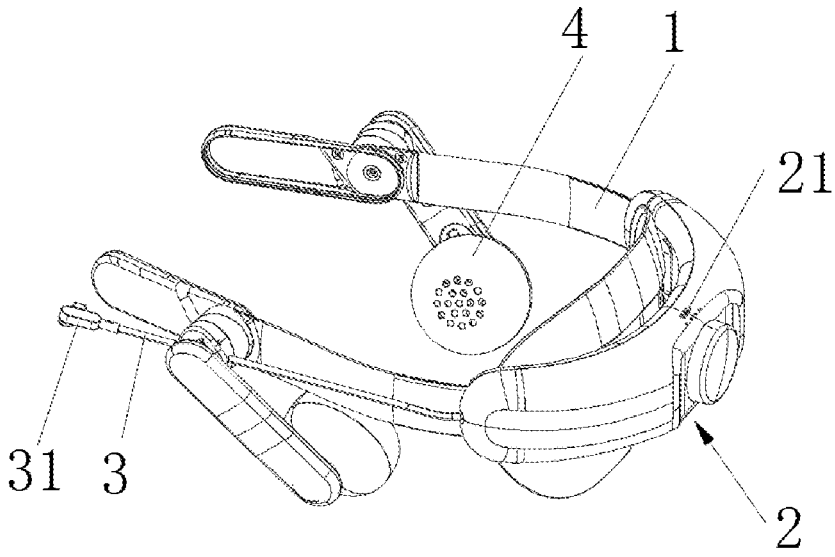
FIG. 1 is a schematic diagram of an overall structure of a VR headband according to an embodiment of the present invention.
Figure 2:
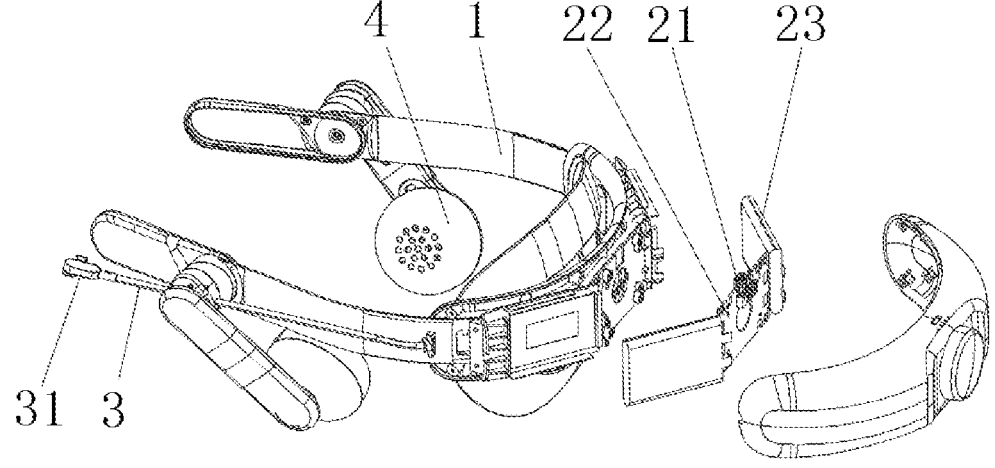
FIG. 2 is a schematic exploded structural diagram of a VR headband according to an embodiment of the present invention.

In order to facilitate the understanding of the control circuit of the solution, the VR headband applied therein is first introduced:

Referring to FIG. 1 and FIG. 2, a VR headband having audio, data transmission, and charging functions includes: a headband body 1, a power storage component 2, a USB-C base 21, a transmission line 3, and earphones 4.

The power storage component 2 is disposed on a rear side of the headband body 1. The power storage component 2 includes a circuit board 22 and a rechargeable battery 23 connected to the circuit board 22. The USB-C base 21 is disposed on the power storage component 2 and connected to the circuit board 22. The transmission line 3 is connected to the circuit board 22. The earphones 4 are disposed on the headband body 1. The USB-C base 21 is configured to externally connect a power supply, so as to charge the rechargeable battery 23. The USB-C base 21 is further configured to externally connect a terminal device, so as to perform signal transmission on the transmission line 3. The transmission line 3 is configured to connect VR glasses mounted on a front side of the headband body 1, so as to supply power and transmit a signal to the VR glasses. An output port of the VR glasses is connected to the circuit board 22 through an audio line, and the circuit board 22 is connected to interfaces of the earphones through another audio line, so as to receive an audio. The earphones 4 include a left earphone and a right earphone and are symmetrically disposed on two sides of the headband body 1.

In this embodiment, the additional audio function on the VR headband is implemented through a circuit of the VR glasses, the audio line, the circuit board, and the earphones 4, so that the sound quality of the earphones 4 can be improved, so as to improve the user experience. In this embodiment, the additional data transmission function on the VR headband is sequentially implemented through a circuit of the USB-C base 21, the circuit board 22, and the transmission line 3, so that transmission of data of the VR glasses by a peripheral terminal device can be implemented. In this embodiment, the additional charging function on the VR headband is sequentially implemented through a circuit of the USB-C base 21, the circuit board 22, and the rechargeable battery 23. After the rechargeable battery 23 stores electricity, the VR glasses can be powered by the transmission line 3 in a scenario without an external power supply, so as to provide long-term battery life of the VR glasses, and effectively improve the overall application experience for the user.

In the prior art, because existing VR glasses are usually directly connected to an earphone by an audio line, the sound quality is relatively ordinary when audio transmission is performed by the VR glasses, and a good sound quality cannot be provided, resulting in the presence of optimization space for audio user experience. In contrast, in this embodiment, by providing an audio circuit having a high sound quality on the VR headband, the audio data can be optimized, so as to improve the sound quality effect.

In circuit design of some audio lines, an audio line connected from the VR glasses to the circuit board 22, and an audio line connected from the circuit board 22 to the interface of the earphone both can be built-in and hidden in the headband body 1, so as to avoid circuit clutter caused by exposure, and the built-in hiding design can also improve the aesthetics of appearance.

In the prior art, because generally only one access port is designed on the existing VR glasses, when charging and data transmission are performed on the VR glasses in the prior art, an external power supply or/and a peripheral terminal device are separately and successively connected to the access port on the VR glasses, to then perform charging and data transmission successively, and charging and data transmission need to be switched through a plug type line, and switching over a long-term use is also prone to cause an unstable line connection. In contrast, in this embodiment, the power storage component 2 and the transmission line 3 are integrated on the VR headband, the data transmission function and the charging function are integrated by using the circuit board 22 built in the power storage component 2 as a carrier, the functions of charging and data transmission are implemented through one same transmission line, and there is no need to perform plug type switching of a plurality of lines.

Therefore, in this embodiment, structures and circuits of the audio function, the data transmission function, and the charging function are integrated into the VR headband, so that a more novel multi-functional integrated design is implemented and a more intelligent and convenient user experience is achieved.

In some embodiments, the transmission line 3 of the present invention may use a 3.0 data line, which can provide better power efficiency management and a more efficient data transmission rate, and especially when larger application data needs to be transmitted to the VR glasses, the transmission time is greatly reduced.

In some embodiments, the output end of the transmission line 3 is provided with a magnetic charging member, and the magnetic charging member is configured to externally connect a disposed magnetic charging apparatus, so as to charge the VR glasses. The magnetic charging apparatus in this embodiment may be a charging seat matched with the VR glasses, and in daily charging, the VR glasses may be placed on the magnetic charging apparatus, the magnetic charging member on the transmission line 3 is magnetically connected to a charging position on the magnetic charging apparatus, so that magnetic charging is performed to charge the VR glasses.

Based on the introduction of the VR headband, the control circuit having audio, data transmission, and charging functions is described in detail below.

Figure 3:
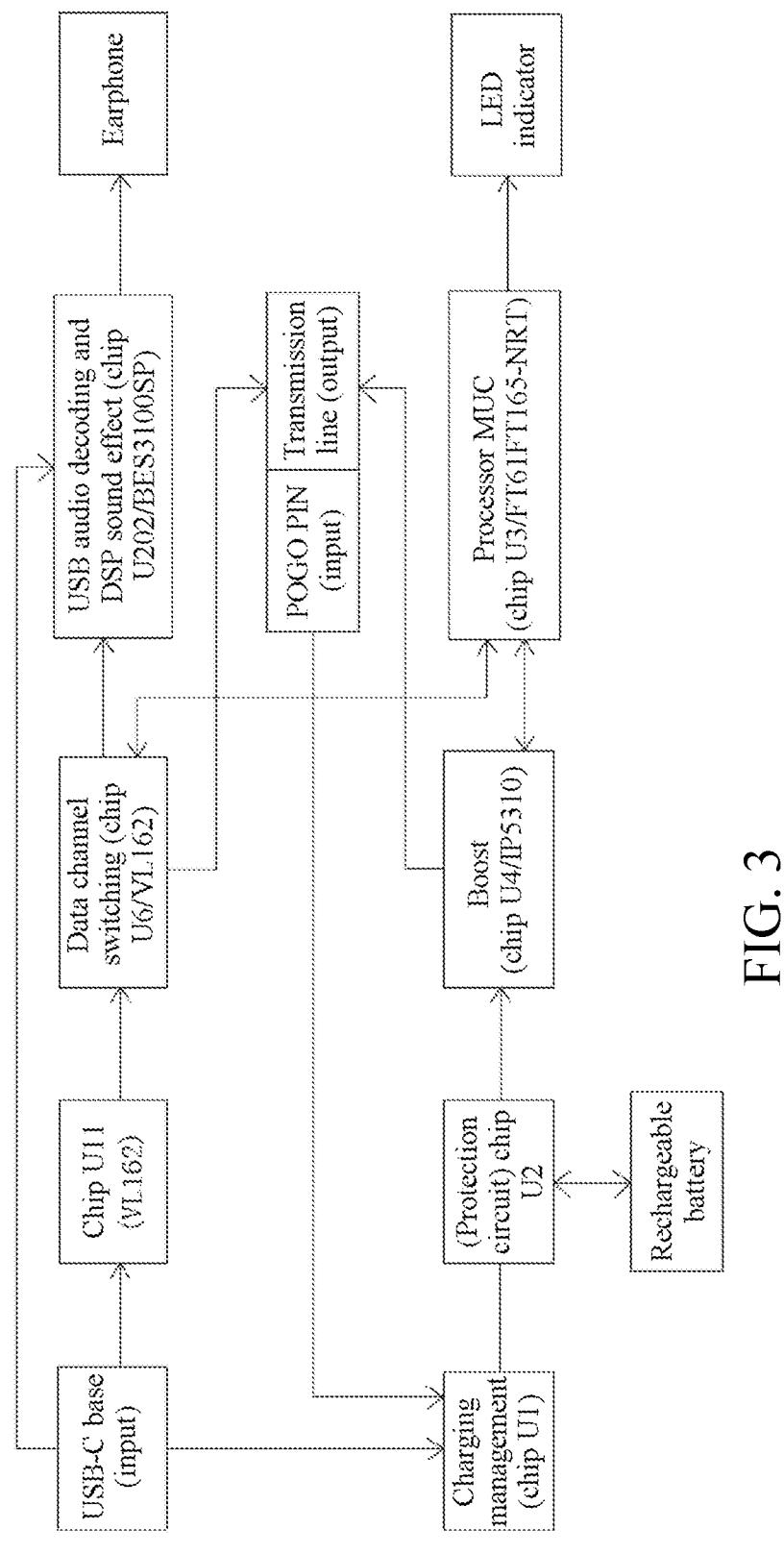
FIG. 3 is a system principle block diagram of a control circuit according to an embodiment of the present invention.

As shown in FIG. 3, the control circuit of the present invention includes:

a DSP audio circuit, where an input end of the DSP audio circuit is connected to VR glasses, an output end of the DSP audio circuit is connected to an earphone, and the DSP audio circuit is configured to perform signal optimization on audio data inputted by the VR glasses and then output optimized audio data to the earphone;

a data transmission circuit, where an input end of the data transmission circuit is connected to a USB-C base on the power storage component, an output end of the data transmission circuit is connected to the transmission line, and the data transmission circuit is configured to convert a differential signal inputted by the USB-C base and then output a converted signal to the transmission line;

a charging circuit, where an input end of the charging circuit is connected to the USB-C base, an output end of the charging circuit is connected to a rechargeable battery in the power storage component, and the charging circuit is configured to buck a high voltage inputted by the USB-C base and then output a bucked voltage to the rechargeable battery; and a discharging circuit, where an input end of the discharging circuit is connected to the rechargeable battery, an output end of the discharging circuit is connected to the transmission line, and the discharging circuit is configured to boost a voltage outputted by the rechargeable battery and then output a boosted voltage to the transmission line.

In this embodiment, the charging circuit, the discharging circuit, the data transmission circuit, and the DSP audio circuit are integrated, so that the DSP audio function, the data transmission function, and the charging function of the VR glasses are attached to the VR headband.

Figure 11:
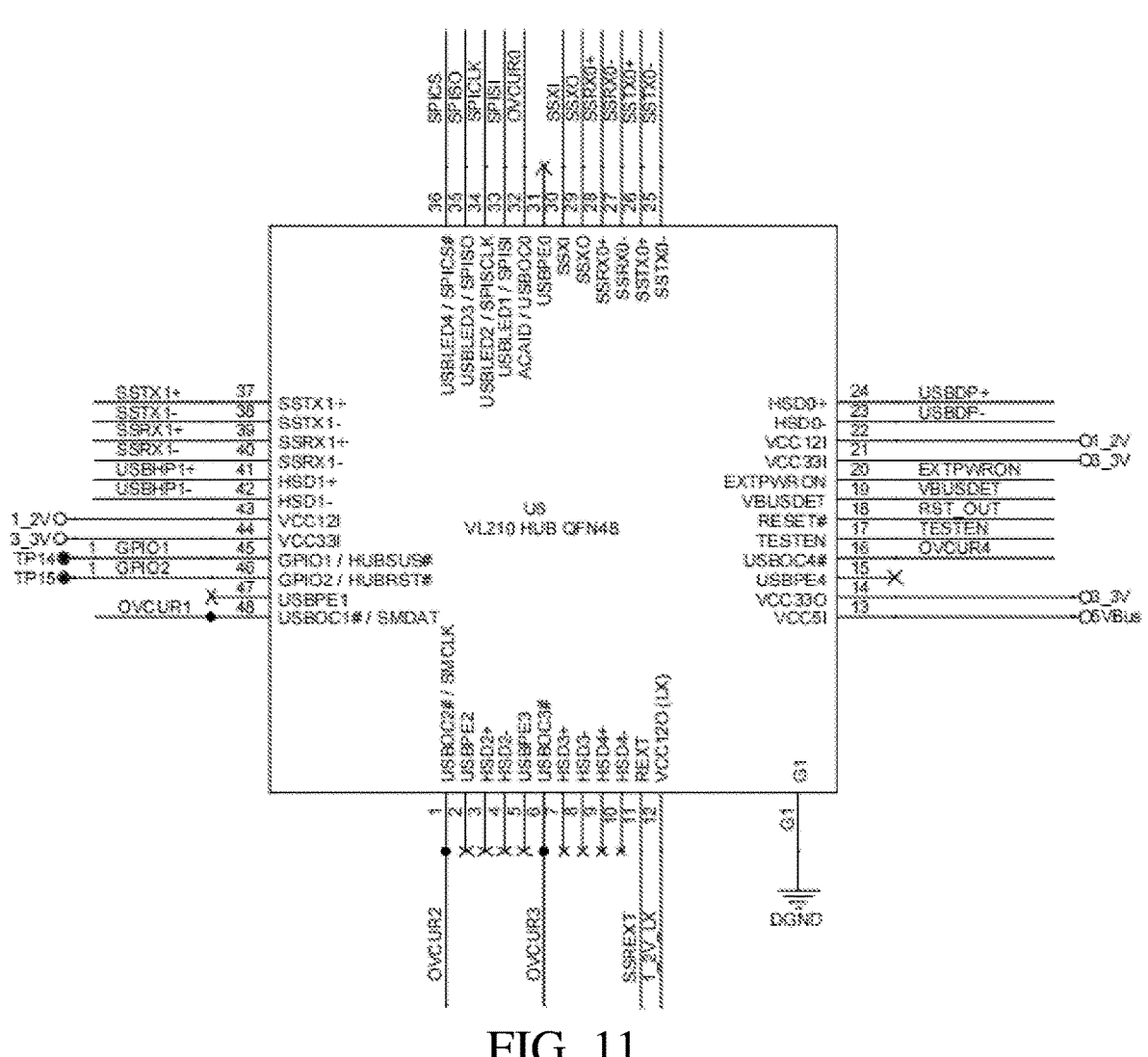
FIG. 11 is a control principle diagram of a chip U6 according to an embodiment of the present invention.

In combination with FIG. 11 and FIG. 12, the DSP audio circuit is described in more detail below:

In some embodiments, the DSP audio circuit includes an output port of the VR glasses, a chip U6, a chip U202, and an interface of the earphone; the output port of the VR glasses is connected to an audio data input end of the chip U6, an audio data output end of the chip U6 is connected to an audio data input end of the chip U202, and an audio data output end of the chip U202 is connected to the interface of the earphone. The output port of VR glasses is connected to the audio data input end of the chip U6 by an audio line, and the audio data output end of the chip U202 is connected to the interface of the earphone by another audio line.

The audio data input end of the chip U6 includes a USB_DP pin and a USB_DM pin of the chip U6, and the audio data output end of the chip U6 includes a $41^{st}$ pin and a $42^{nd}$ pin of the chip U6.

The audio data input end of the chip U202 includes a USB_DP pin and a USB_DM pin of the chip U202, and the audio data output end of the chip U202 includes a pin J5 of the chip U202.

In this embodiment, during DSP audio transmission, for USB signals (USBHP1+_E and USBHP1−_E) entering the VR glasses through an interface of the chip U8, the USB signals are transmitted from the VR glasses to the USB_DP pin and the USB_DM pin of the chip U6 by an audio line, and undergo signal amplification by the chip U6 to then obtain audio data; further, the $41^{st}$ pin and $42^{nd}$ pin of the chip U6 output the audio data to the USB_DP pin of the chip U202 (i.e., a pin A4 of the chip U202) and the USB_DM pin (i.e., a pin A5 of the chip U202); after decoding and audio optimization by the chip U202, the audio data is transmitted to the interface of the earphone by a pin J5 of the chip U202, so that audio reception of the earphone can be implemented.

Figure 12:
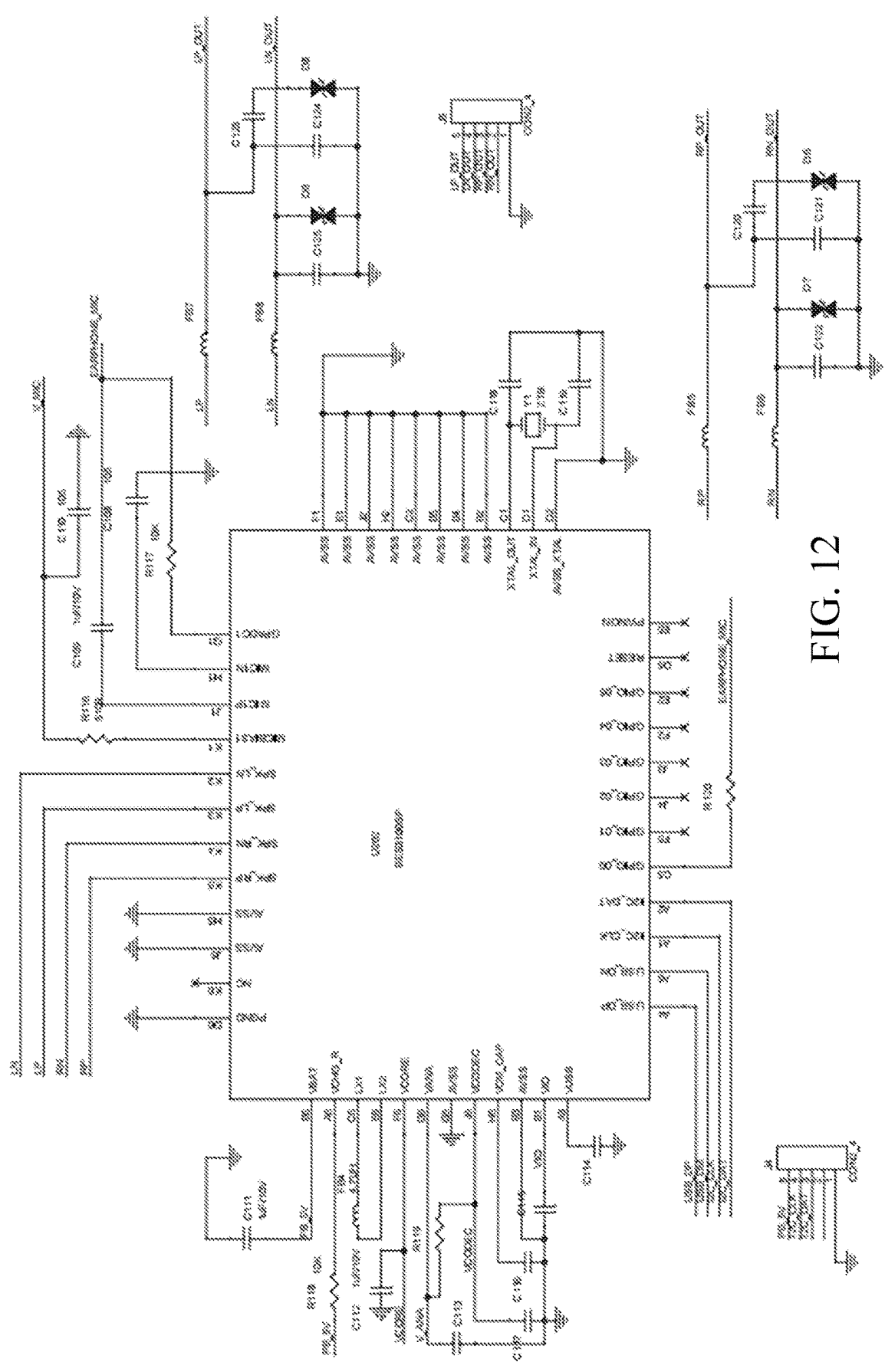
FIG. 12 is a control principle diagram of a chip U202 according to an embodiment of the present invention.

In some embodiments of the audio optimization, as shown in FIG. 12, an audio optimization circuit is provided in the chip U202. An SPK_LN pin and an SPK_LP pin of the chip U202 are respectively connected to an LN end and an LP end of the audio optimization circuit, and an LP_OUT end and an LN_OUT end of the audio optimization circuit are connected back to a pin J5 of the chip U202. An SPK_RN pin and an SPK_RP pin of the chip U202 are respectively connected to an RN end and an RP end of the audio optimization circuit, and an RP_OUT end and an RN_OUT end of the audio optimization circuit are connected back to the pin J5 of the chip U202.

In this embodiment, the SPK_LN pin and the SPK_LP pin of the chip U202 are respectively connected to the LN end and the LP end of the audio optimization circuit, so as to perform audio optimization on the left earphone in the audio optimization circuit. The SPK_RN pin and the SPK_RP pin of the chip U202 are respectively connected to the RN end and the RP end of the audio optimization circuit, so as to perform audio optimization on the right earphone in the audio optimization circuit.

In this embodiment, after the audio optimization, an LP_OUT end, an LN_OUT end, an RP_OUT end, and an RN_OUT end of the audio optimization circuit are respectively connected back to the pin J5 of the chip U202; a $2^{nd}$ interface to a $5^{th}$ interface of the pin J5 are respectively connected to the RN_OUT end, the RP_OUT end, the LN_OUT end, and the LP_OUT end; and a $1^{st}$ interface of the pin J5 is separately connected to the left earphone and the right earphone, so as to implement transmission of an optimized audio.

In another embodiment, the DSP audio circuit may also be directly connected to the chip U202 by a USB-C base, and the chip U202 performs decoding and audio optimization, and then transmits the audio to the interface of the earphone through the pin J5 of the chip U202, so as to receive an audio of the earphone.

Figure 10:
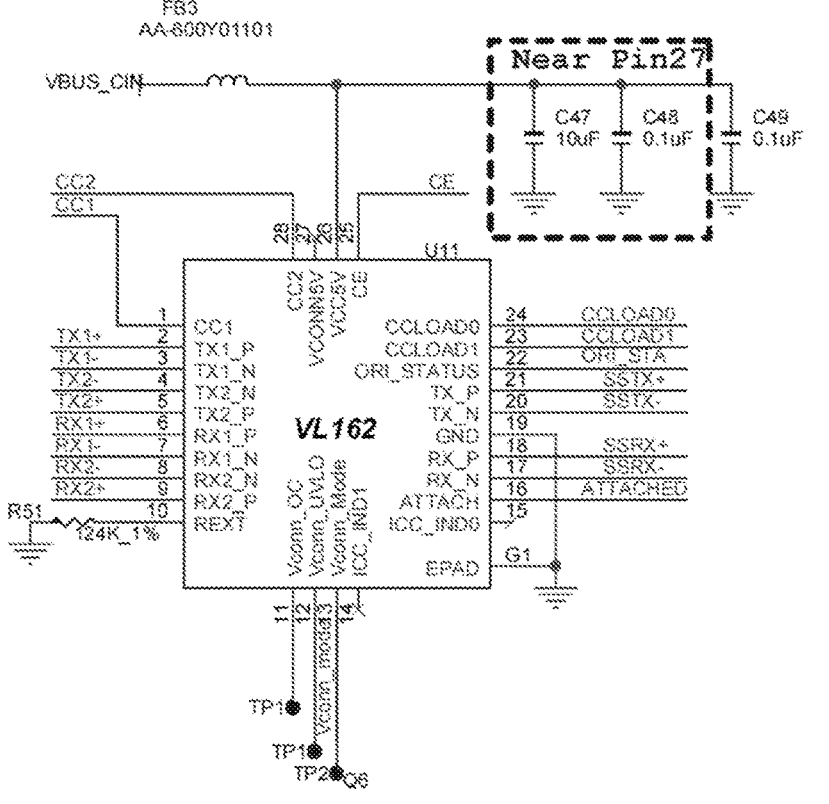
FIG. 10 is a control principle diagram of a chip U11 according to an embodiment of the present invention.

In combination with FIG. 4, FIG. 10, and FIG. 11, the data transmission circuit is described in more detail below:

In some embodiments, the data transmission circuit is formed by connecting a 3.0 signal output end of the USB-C base, a disposed chip U11, a chip U6, and the transmission line; the 3.0 signal output end of the USB-C base is connected to a 3.0 signal input end of the chip U11, a 3.0 signal output end of the chip U11 is connected to a 3.0 signal input end of the chip U6, and a 3.0 signal output end of the chip U6 is connected to the transmission line.

Figure 4:
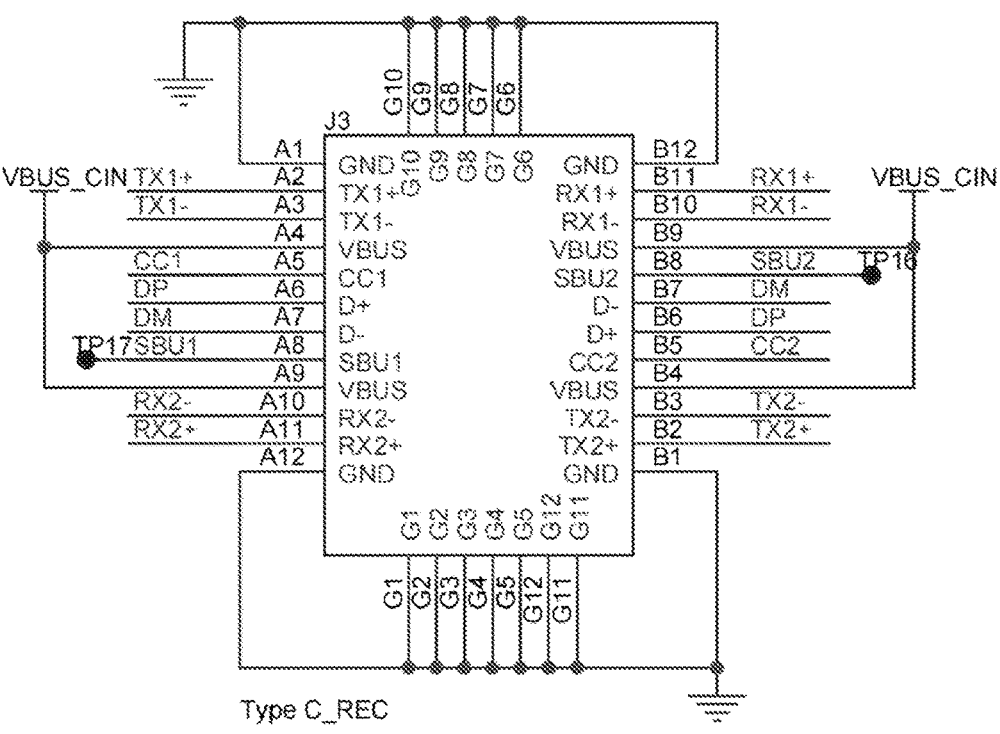
FIG. 4 is a control principle diagram of a USB-C base according to an embodiment of the present invention.
Figure 5:
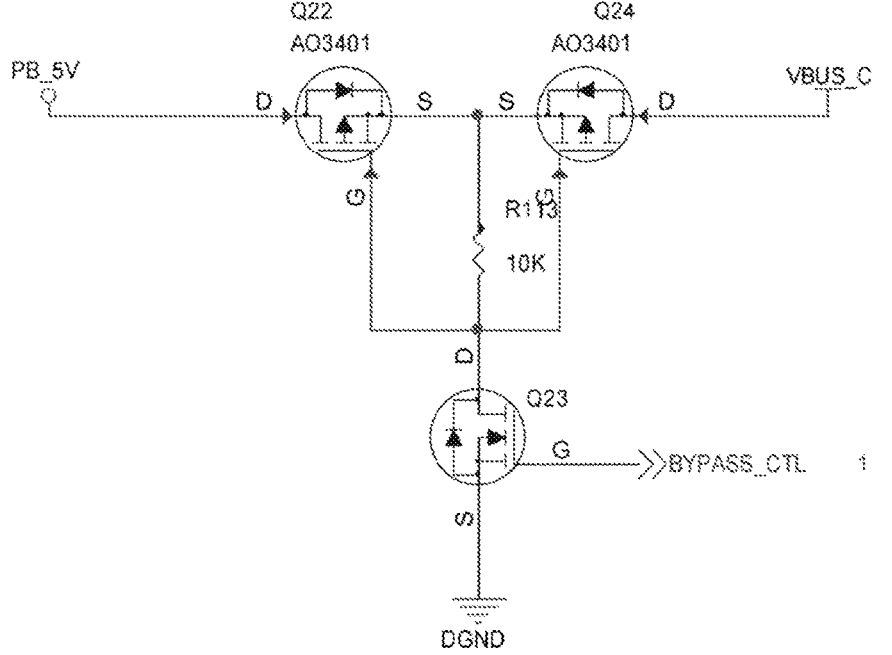
FIG. 5 is a circuit principle diagram of a MOS transistor switch according to an embodiment of the present invention.
Figure 6:
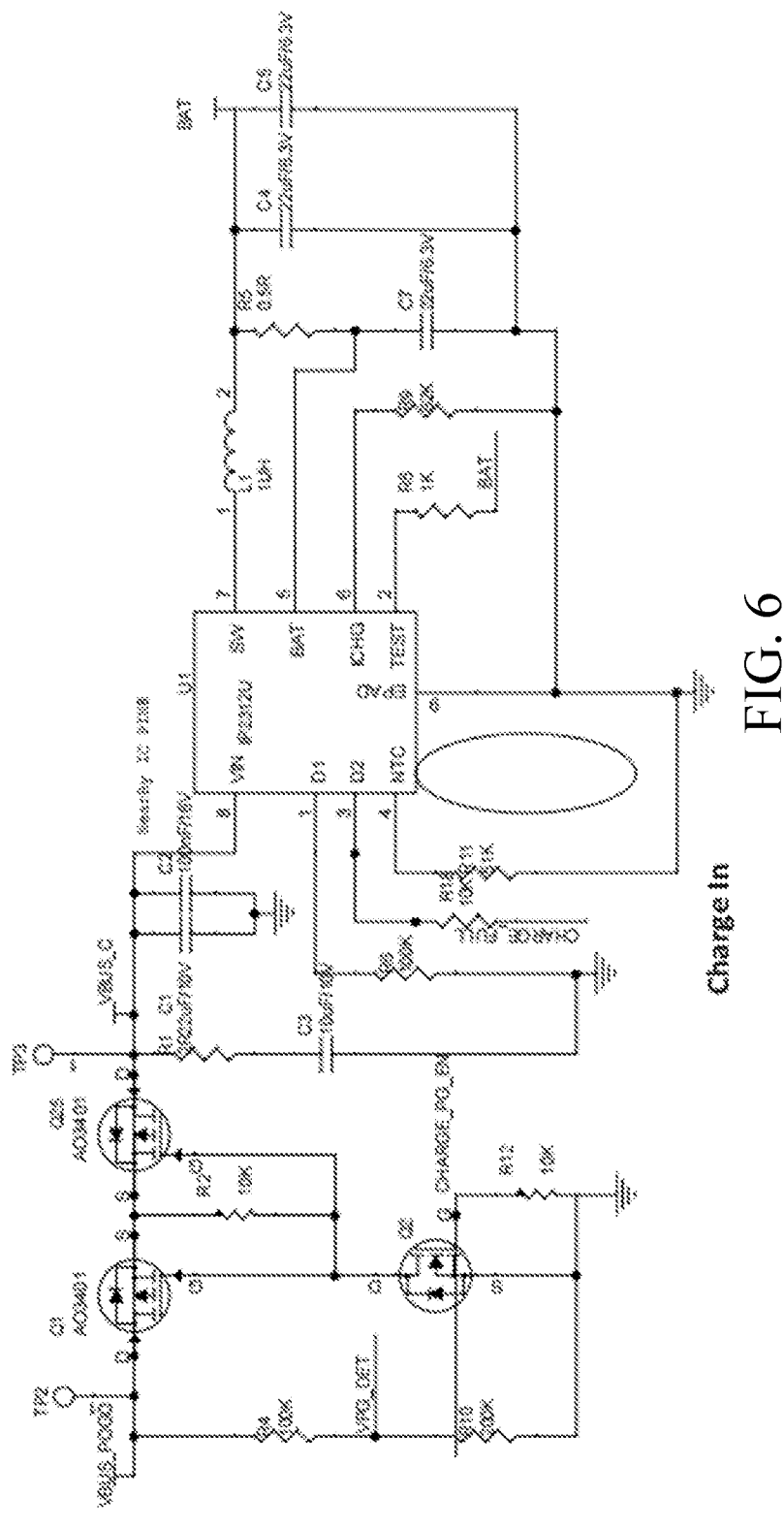
FIG. 6 is a control principle diagram of a chip U1 according to an embodiment of the present invention.
Figure 7:
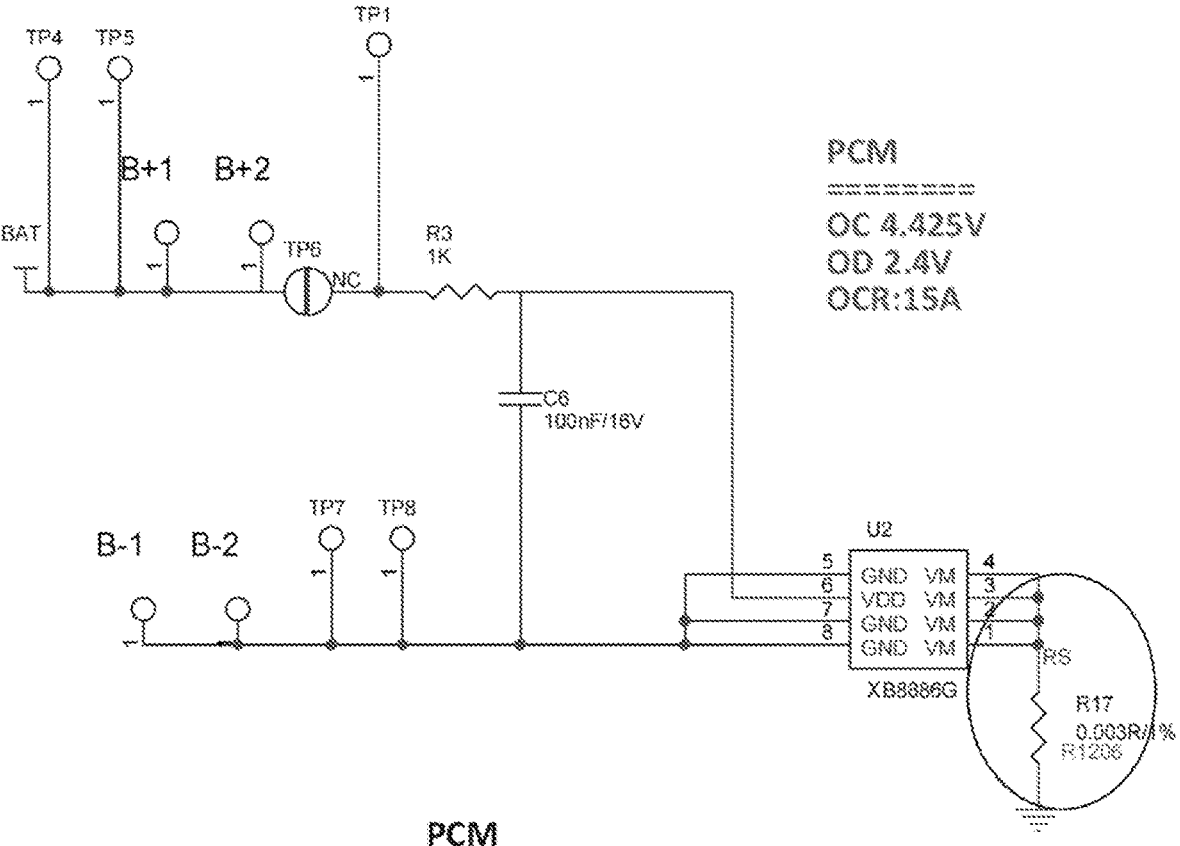
FIG. 7 is a circuit principle diagram of a lithium protection chip U2 according to an embodiment of the present invention.

The 3.0 signal output end of the USB-C base includes pins A2, A3, A10, A11, B2, B3, B10, and B11 of the USB-C base (i.e., a corresponding transmit TX line and receive RX line in FIG. 4).

The 3.0 signal input end of the chip U11 includes a $2^{nd}$ pin and a $9^{th}$ pin of the chip U11, and the 3.0 signal output end of the chip U11 includes a $17^{th}$ pin, an $18^{th}$ pin, a $20^{th}$ pin, and a $21^{st}$ pin of the chip U11.

The 3.0 signal input end of the chip U6 includes a $25^{th}$ pin and a $28^{th}$ pin of the chip U6, and the 3.0 signal output end of the chip U6 includes a $37^{th}$ pin to a $40^{th}$ pin of the chip U6.

In this embodiment, during 3.0 data transmission, the externally connected terminal device is connected to the USB-C base and inputs a USB 3.0 differential signal, the USB 3.0 differential signal is transmitted to a 3.0 signal input end of the chip U11 through a 3.0 signal output end of the USB-C base, the chip U11 converts the USB 3.0 differential signal into a single signal, and then the output end of the chip U11 transmits the single signal to the 3.0 signal input end of the chip U6; the single signal is amplified by the chip U6 and then transmitted to the transmission line (i.e., a pin A2 and a pin A3 of the chip U8), and then transmitted from a Type-C male end of the transmission line (i.e., a pin A10 and a pin A11 of the chip U8) to the access port of the VR glasses, thereby completing the 3.0 data transmission.

In another embodiment, the data transmission circuit may further transmit a USB 2.0 differential signal. Specifically, during 2.0 data transmission, the external terminal device is connected to the USB-C base and inputs the USB 2.0 differential signal, and the USB 2.0 differential signal is directly transmitted to a $23^{rd}$ pin and a $24^{th}$ pin of the chip U6 through pins A6, A7, B6, and B7 of the USB-C base, so that the chip U6 performs signal processing on the USB 2.0 differential signal and then transmits the processed signal to the transmission line (that is, a pin A6 and a pin A7 of the chip U8), and then the signal is transmitted from a Type-C male end of the transmission line to the access port of the VR glasses, thereby completing the 2.0 data transmission.

In combination with FIG. 4 to FIG. 7, the charging circuit is described in more detail below:

In some embodiments, the charging circuit includes a MOS transistor switch, a chip U1, and a lithium protection chip U2; a VBUS_CIN end of the USB-C base is connected to a VBUS_C end of the MOS transistor switch, a DGND end of the MOS transistor switch is connected to an $8^{th}$ pin of the chip U1, a $9^{th}$ pin of the chip U1 is connected to a ground end of the lithium protection chip U2, and a $7^{th}$ pin of the chip U1 and a $6^{th}$ pin of the lithium protection chip U2 are separately connected to the rechargeable battery.

A VBUS_CIN end of the USB-C base includes pins A4, A9, B4, and B9 of the USB-C base. The ground end of the lithium protection chip U2 includes a $1^{st}$ pin to a $4^{th}$ pin of the lithium protection chip U2.

In this embodiment, during charging, an external power supply is connected to the USB-C base and inputs a voltage, the voltage is transmitted to the VBUS_C end of the MOS transistor switch through the VBUS_CIN end of the USB-C base, the voltage is transmitted to an $8^{th}$ pin of the chip U1 by a DGND end of the MOS transistor switch, the voltage is reduced by the chip U1 and then transmitted to the rechargeable battery through a $7^{th}$ pin of the chip U1, so as to charge the rechargeable battery. In order to ensure normal charging and discharging of the rechargeable battery, the lithium protection chip U2 is provided, a $9^{th}$ pin of the chip U1 is connected to the ground end of the lithium protection chip U2, and a $6^{th}$ pin of the lithium protection chip U2 is connected to the rechargeable battery; the chip U1 can perform protection operations such as measuring a charging voltage or a battery temperature, normal charging and discharging of the rechargeable battery can be ensured.

Figure 8:
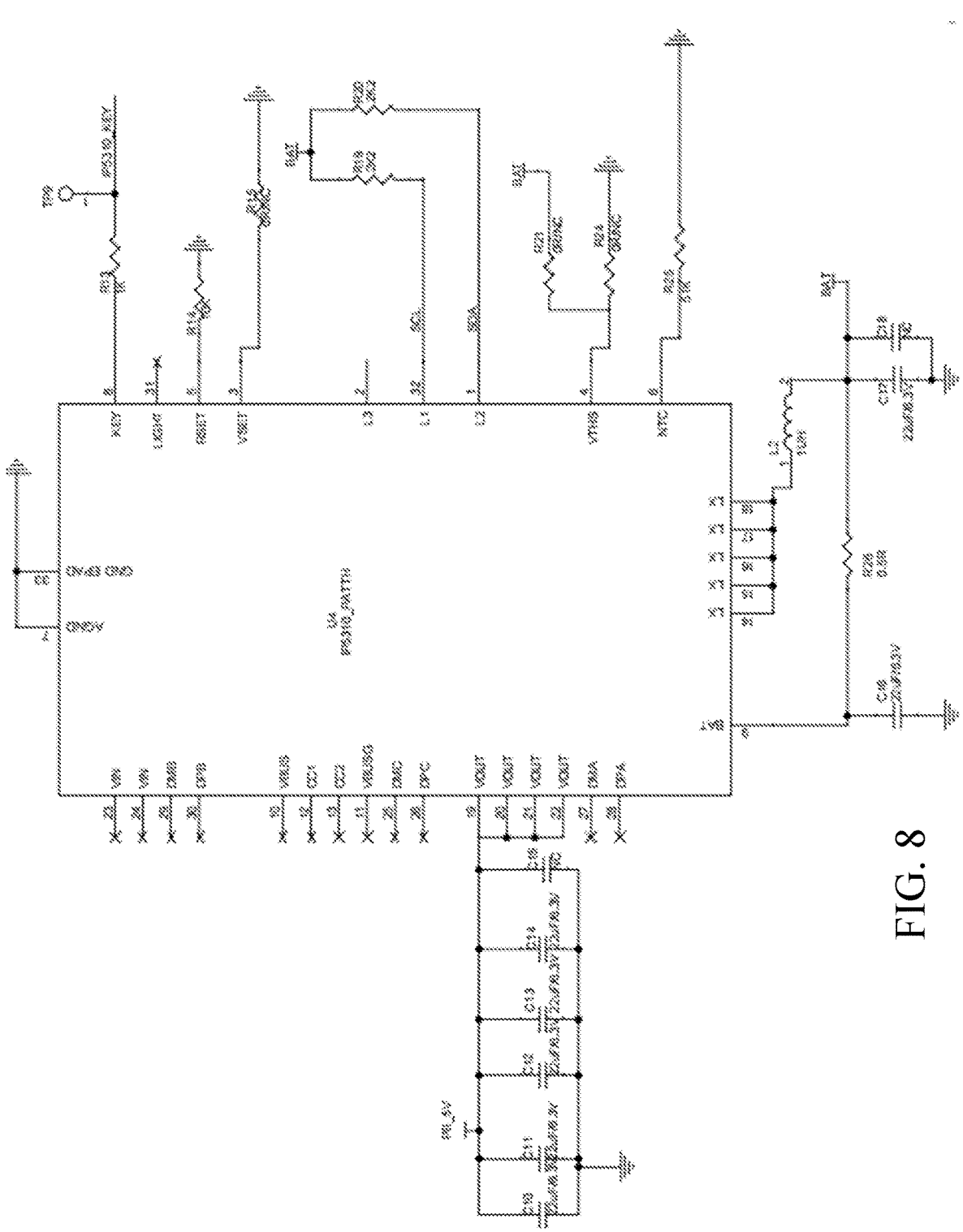
FIG. 8 is a control principle diagram of a chip U4 according to an embodiment of the present invention.
Figure 9:
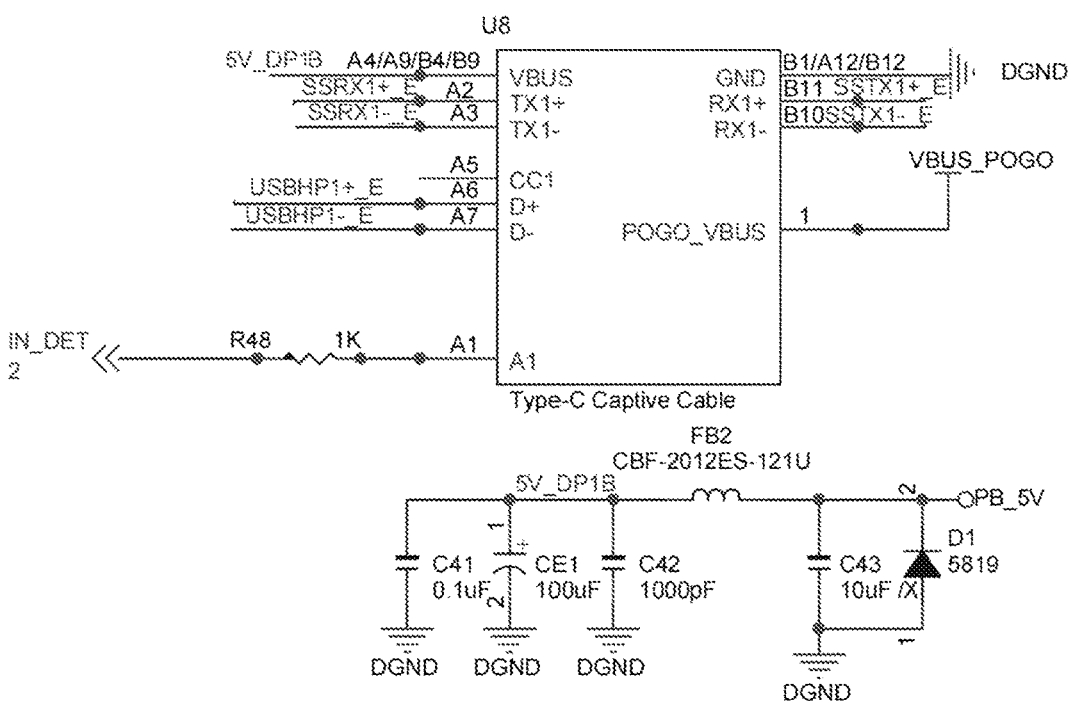
FIG. 9 is a control principle diagram of a transmission line according to an embodiment of the present invention.

In combination with FIG. 8 and FIG. 9, the discharging circuit is described in more detail below:

In some embodiments, the discharging circuit is formed by connecting the rechargeable battery, the lithium protection chip U2, a disposed chip U4, the MOS transistor switch, and the transmission line; and the rechargeable battery is separately connected to a $6^{th}$ pin of the lithium protection chip U2 and a $9^{th}$ pin of the chip U4, a ground end of the lithium protection chip U2 is connected to a ground end of the chip U4, a PB end of the chip U4 is connected to a PB end of the MOS transistor switch, and a DGND end of the MOS transistor switch is connected to the transmission line.

The ground end of the chip U4 includes a $7^{th}$ pin and a $33^{rd}$ pin of the chip U4; and the PB end of the chip U4 includes a $19^{th}$ pin to a $22^{nd}$ pin of the chip U4.

In this embodiment, during discharging (i.e., charging VR glasses), the rechargeable battery transmits the voltage to the $9^{th}$ pin of the chip U4, and the voltage is boosted by the chip U4 and then transmitted to the PB end of the MOS transistor switch through the PB end of the chip U4, and then the voltage is transmitted to the transmission line by the DGND end of the MOS transistor switch, and the VR glasses can be charged by sending the male end of the output line to the VR glasses. The control principle of the Type-C male head output end of the output line is the control principle of the chip U8 as shown in FIG. 9. After the DGND end of the MOS transistor switch transmits the voltage to VBUS pins of the chip U8 (i.e., pins A4, A6, B4, and B6 in FIG. 9), then a pin B10 and a pin B11 of the chip U8 are outputted to the Type-C male interface, so as to charge the VR glasses.

Based on the foregoing VR headband and control circuit, the present invention integrates the power storage component 2, the transmission line 3, and the earphone on the headband body 1, and integrates the DSP audio circuit, the data transmission circuit, and the charging circuit on the circuit board built in the power storage component 2, so that not only a lighter and simpler design in structure is implemented, but also integration of more functions that can be realized at a same time can be implemented, thereby greatly improving the user experience.

In the present invention, it is also necessary to note that two-way connection may present in the introduction of the input end and output end of each component, such as in the introduction of an input end including a plurality of pins, the plurality of pins are not all input pins, and some pins need to be used as receive pins, so as to achieve two-way connection; for example, the 3.0 signal output end of the USB-C base includes pins A2, A3, A10, A11, B2, B3, B10, and B11, where there is a transmit TX part and a receive RX part, and for details, reference may be made to pin information shown in the accompanying drawings.

Figure 13:
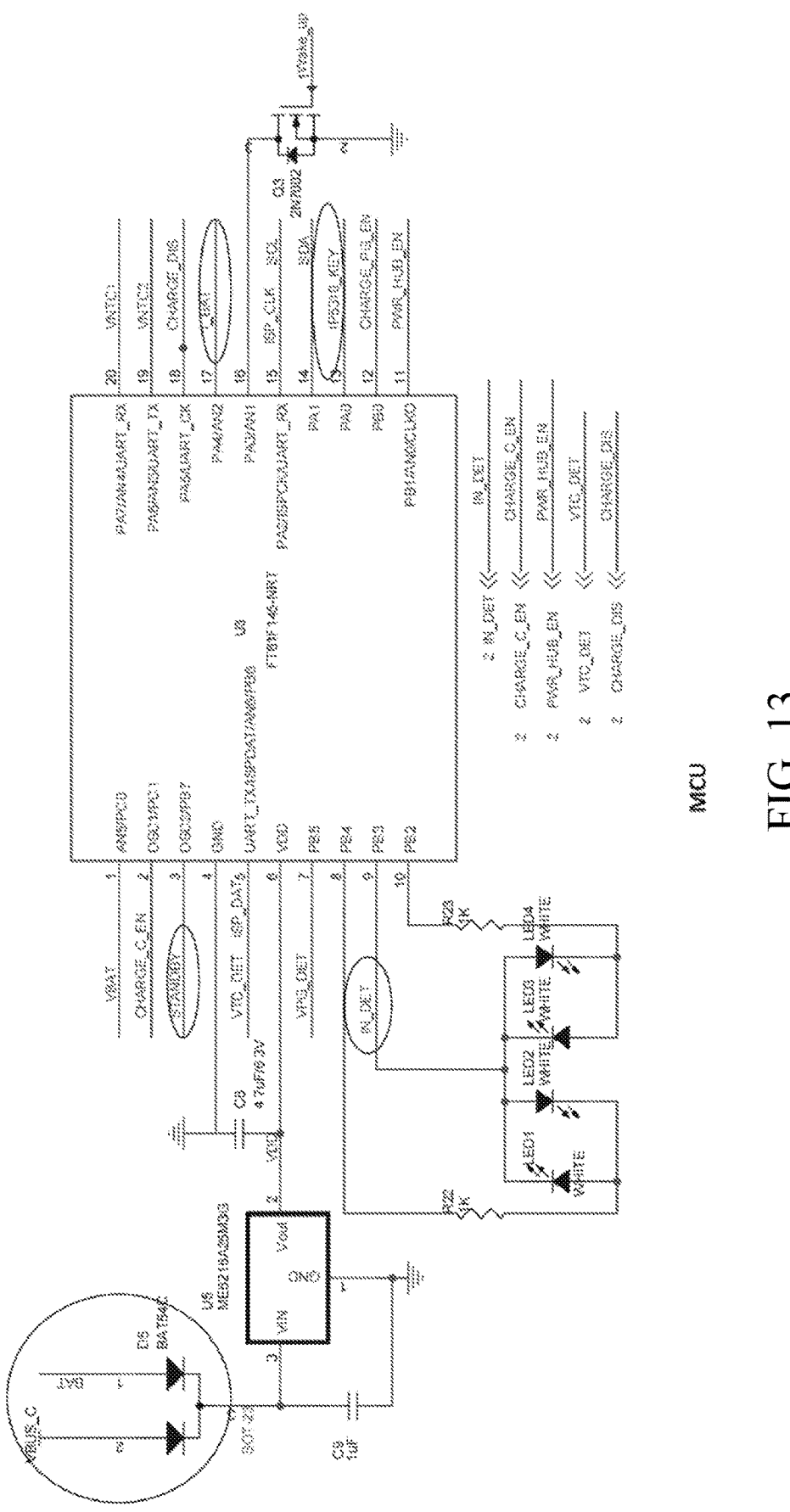
FIG. 13 is a control principle diagram of a chip U3 according to an embodiment of the present invention.

It should be understood that, as shown in FIG. 13, the charging circuit, the discharging circuit, and the data transmission circuit of the present invention all need to be controlled by the chip U3 as a control logic unit, so as to implement the operation of the entire control circuit.

Based on the working principle of the foregoing control circuit, the present invention can implement the charging function and data transmission function attached to the VR headband, and has the advantages of convenient charging and data transmission to the VR glasses.

The foregoing descriptions are merely specific implementations of the present invention, but are not intended to limit the scope of protection of the present invention. Any equivalent modification or replacement can be readily figured out by a person skilled in the art within the technical scope disclosed in the present invention, and these modifications or replacements shall fall within the scope of protection of the present invention. Therefore, the scope of protection of the present invention should be subject to the scope of protection of the claims.

What is claimed is:

1. A control circuit having audio, data transmission, and charging functions, applied to a VR headband, wherein the VR headband comprises a headband body and an earphone, a power storage component, and a transmission line integrally disposed on the headband body; and the control circuit comprises:

a DSP audio circuit, wherein an input end of the DSP audio circuit is connected to VR glasses, an output end of the DSP audio circuit is connected to the earphone, and the DSP audio circuit is configured to perform signal optimization on audio data inputted by the VR glasses and then output optimized audio data to the earphone;

a data transmission circuit, wherein an input end of the data transmission circuit is connected to a USB-C base on the power storage component, an output end of the data transmission circuit is connected to the transmission line, and the data transmission circuit is configured to convert a differential signal inputted by the USB-C base and then output a converted signal to the transmission line;

a charging circuit, wherein an input end of the charging circuit is connected to the USB-C base, an output end of the charging circuit is connected to a rechargeable battery in the power storage component, and the charging circuit is configured to buck a high voltage inputted by the USB-C base and then output a bucked voltage to the rechargeable battery; and a discharging circuit, wherein an input end of the discharging circuit is connected to the rechargeable battery, an output end of the discharging circuit is connected to the transmission line, and the discharging circuit is configured to boost a voltage outputted by the rechargeable battery and then output a boosted voltage to the transmission line;

wherein the DSP audio circuit comprises an output port of the VR glasses, a chip U6, a chip U202, and an interface of the earphone; the output port of the VR glasses is connected to an audio data input end of the chip U6, an audio data output end of the chip U6 is connected to an audio data input end of the chip U202, and an audio data output end of the chip U202 is connected to the interface of the earphone;

wherein the output port of VR glasses is connected to the audio data input end of the chip U6 by an audio line, and the audio data output end of the chip U202 is connected to the interface of the earphone by another audio line.

2. The control circuit having audio, data transmission, and charging functions according to claim 1, wherein the audio data input end of the chip U6 comprises a USB_DP pin and a USB_DM pin of the chip U6, and the audio data output end of the chip U6 comprises a $41^{st}$ pin and a $42^{nd}$ pin of the chip U6; and the audio data input end of the chip U202 comprises a USB_DP pin and a USB_DN pin of the chip U202, and the audio data output end of the chip U202 comprises an AVSS pin of the chip U202.

3. The control circuit having audio, data transmission, and charging functions according to claim 2, wherein an audio optimization circuit is provided in the chip U202, wherein an SPK_LN pin and an SPK_LP pin of the chip U202 are respectively connected to an LN end and an LP end of the audio optimization circuit, and an LP_OUT end and an LN_OUT end of the audio optimization circuit are connected back to a pin J5 of the chip U202; and an SPK_RN pin and an SPK_RP pin of the chip U202 are respectively connected to an RN end and an RP end of the audio optimization circuit, and an RP_OUT end and an RN_OUT end of the audio optimization circuit are connected back to the pin J5 of the chip U202.

4. The control circuit having audio, data transmission, and charging functions according to claim 1, wherein the data transmission circuit is formed by connecting a 3.0 signal output end of the USB-C base, a disposed chip U11, the chip U6, and the transmission line; the 3.0 signal output end of the USB-C base is connected to a 3.0 signal input end of the chip U11, a 3.0 signal output end of the chip U11 is connected to a 3.0 signal input end of the chip U6, and a 3.0 signal output end of the chip U6 is connected to the transmission line; and the chip U11 is configured to convert a USB 3.0 differential signal inputted from the USB-C base into a single signal and then send the single signal to the chip U6, and the chip U6 is configured to amplify the single signal and then output an amplified single signal to the transmission line.

5. The control circuit having audio, data transmission, and charging functions according to claim 4, wherein the 3.0 signal output end of the USB-C base comprises pins A2, A3, A10, A11, B2, B3, B10, and B11 of the USB-C base;

the 3.0 signal input end of the chip U11 comprises a $2^{nd}$ pin and a $9^{th}$ pin of the chip U11;

the 3.0 signal output end of the chip U11 comprises a $17^{th}$ pin, an $18^{th}$ pin, a $20^{th}$ pin, and a $21^{st}$ pin of the chip U11;

the 3.0 signal input end of the chip U6 comprises a $25^{nd}$ pin and a $28^{th}$ pin of the chip U6; and the 3.0 signal output end of the chip U6 comprises a $37^{th}$ pin to a $40^{th}$ pin of the chip U6.

6. The control circuit having audio, data transmission, and charging functions according to claim 1, wherein the charging circuit comprises a MOS transistor switch, a chip U1, and a lithium protection chip U2; a VBUS-_CIN end of the USB-C base is connected to a VBUS_C end of the MOS transistor switch, a DGND end of the MOS transistor switch is connected to an $8^{th}$ pin of the chip U1, a $9^{th}$ pin of the chip U1 is connected to a ground end of the lithium protection chip U2, and a $7^{th}$ pin of the chip U1 and a $6^{th}$ pin of the lithium protection chip U2 are separately connected to the rechargeable battery.

7. The control circuit having audio, data transmission, and charging functions according to claim 6, wherein the VBUS_CIN end of the USB-C base comprises pins A4, A9, B4, and B9 of the USB-C base; and the ground end of the lithium protection chip U2 comprises a $1^{st}$ pin to a $4^{th}$ pin of the lithium protection chip U2.

8. The control circuit having audio, data transmission, and charging functions according to claim 7, wherein the discharging circuit is formed by connecting the rechargeable battery, the lithium protection chip U2, a disposed chip U4, the MOS transistor switch, and the transmission line; and the rechargeable battery is separately connected to a $6^{th}$ pin of the lithium protection chip U2 and a $9^{th}$ pin of the chip U4, a ground end of the lithium protection chip U2 is connected to a ground end of the chip U4, a PB end of the chip U4 is connected to a PB end of the MOS transistor switch, and a DGND end of the MOS transistor switch is connected to the transmission line.

9. The control circuit having audio, data transmission, and charging functions according to claim 8, wherein the ground end of the chip U4 comprises a $7^{th}$ pin and a $33^{rd}$ pin of the chip U4; and the PB end of the chip U4 comprises a $19^{th}$ pin to a $22^{nd}$ pin of the chip U4.

10. A VR headband having audio, data transmission, and charging functions, comprising the control circuit according to claim 1.

11. A VR headband having audio, data transmission, and charging functions, comprising the control circuit according to claim 2.

12. A VR headband having audio, data transmission, and charging functions, comprising the control circuit according to claim 3.

13. A VR headband having audio, data transmission, and charging functions, comprising the control circuit according to claim 4.

14. A VR headband having audio, data transmission, and charging functions, comprising the control circuit according to claim 5.

15. A VR headband having audio, data transmission, and charging functions, comprising the control circuit according to claim 6.

16. A VR headband having audio, data transmission, and charging functions, comprising the control circuit according to claim 7.

17. A VR headband having audio, data transmission, and charging functions, comprising the control circuit according to claim 8.

18. A VR headband having audio, data transmission, and charging functions, comprising the control circuit according to claim 9.

* * * * *